United States Patent [19]

Anderson

[11] Patent Number: 5,618,228
[45] Date of Patent: Apr. 8, 1997

[54] HOLDING FIXTURE FOR A WHEEL AND TIRE ASSEMBLY

[76] Inventor: Richard L. Anderson, 5183 Limaburg Rd., Burlington, Ky. 41005-9508

[21] Appl. No.: 491,799

[22] Filed: Jun. 19, 1995

Related U.S. Application Data

[63] Continuation of Ser. No. 209,232, Mar. 14, 1994, abandoned.

[51] Int. Cl.$^6$ ..................................................... B60B 29/00
[52] U.S. Cl. .......................... 451/403; 451/392; 451/397; 414/426; 248/289.11; 269/57; 269/59; 269/74
[58] Field of Search .............................. 451/44, 378, 379, 451/380, 385, 386, 391, 397, 398, 403, 920; 269/46, 47, 48, 50, 57, 58, 59, 63, 74; 414/426, 427, 428, 429, 463, 466; 248/289.11

[56] References Cited

U.S. PATENT DOCUMENTS

| | | |
|---|---|---|
| 666,674 | 1/1901 | Hoffmann ........................... 248/289.11 |
| 1,341,500 | 5/1920 | Durham . |
| 3,556,194 | 1/1971 | Farrington . |
| 4,042,139 | 8/1977 | Pernsteiner et al. ..................... 214/331 |
| 4,486,255 | 12/1984 | Crommelynck et al. . |
| 4,684,310 | 8/1987 | Stange ..................................... 269/58 |
| 4,705,264 | 11/1987 | Hawkins et al. ........................... 269/47 |
| 4,893,772 | 1/1990 | Scott ................................... 248/289.11 |

*Primary Examiner*—Willis Little
*Assistant Examiner*—Eileen P. Morgan
*Attorney, Agent, or Firm*—Frost & Jacobs

[57] ABSTRACT

A holding fixture for a wheel and tire assembly enabling a single person to perform an operation on the tire such as grooving or the like. The fixture comprises a first U-shaped bracket having a base for mounting on a wall or other vertical surface and legs extending perpendicularly from the vertical surface. A second similar U-shaped bracket has a vertical base and horizontal legs adjustably bolted to the legs of the first bracket. The vertical base of the second bracket supports a horizontally extending support tube. A rotatable tube segment has a wheel mounting plate for a wheel and tire assembly affixed to one of its ends and a slotted positioning ring affixed to its other end. The tube segment and its slotted ring and mounting plate are captively and rotatively mounted on the support tube so that a tire and wheel assembly affixed to the mounting plate is rotatable about the support tube. A lock assembly is affixed to the support tube and the base of the second bracket. The lock assembly is releasably engageable in any one of the slots of the slotted positioning ring to hold a tire and wheel assembly mounted on the mounting plate in any one of a number of predetermined rotative positions about the support tube.

7 Claims, 3 Drawing Sheets

HOLDING FIXTURE FOR A WHEEL AND TIRE ASSEMBLY

CROSS-REFERENCE TO RELATED APPLICATION

The present application is a continuation of Ser. No. 08/209,232, filed Mar. 14, 1994 now abandoned, in the name of Richard L. Anderson and entitled TIRE GROOVING HOLDING FIXTURE.

BACKGROUND OF THE INVENTION

1. Field of the Invention

The invention relates to a holding fixture for a wheel and tire assembly, and more particularly to such a fixture which will mount a wheel and tire assembly upright; which will permit rotation thereof; and which will releasably lock the wheel and tire assembly in any one of a number of predetermined rotative positions so that an operation such as grooving can be performed on the tire by one person.

2. Description of the Prior Art

The holding fixture of the present invention has many uses. For example, it can be advantageously used in studding tires of ordinary automobiles. It can also be used for various operations on the tires of dirt track race cars such as cleaning the tires, applying treatment material to the tires, removing glaze from the tires and the like. The holding fixture of the present invention is particularly adapted for use during a tire grooving operation. While not intending to so limit the use of the present invention, for purposes of an exemplary showing it will be described in its application to the grooving of tires of dirt track race cars.

Dirt track race car tire grooving is a well-known and very important part of dirt track racing. Already grooved tires may have additional grooves added thereto, or smooth tires may be grooved to improve their performance on the track. While not a specific part of the present invention, the application, shape, spacing and the like of grooves applied to racing tires is an art and significantly affects the tire performance. It is not uncommon to apply grooves to the tires of a racing car immediately prior to the race and in a manner dependent upon many factors including the track conditions, the ambient moisture, the length of the race, and the like.

As is well known in the art, grooving is usually accomplished by means of a manual grooving tool which comprises a heated blade assembly. Heretofore, grooving was accomplished by two workers per tire, one worker holding the tire in a vertical position and bracing it with his legs, while the other worker applied the grooving thereto. Another common approach was to locate a tire in a horizontal position on an appropriate supporting surface and then to place the tire to be grooved in an upright position on the horizontal tire, with the first worker holding and stabilizing the tire to be grooved by the second worker. It will be understood that either method was characterized by some danger to the workers.

The present invention is based upon the discovery that a simple, readily portable, holding fixture for a wheel and tire assembly can be provided which will hold the wheel and tire assembly in an upright position; will allow the rotation of the wheel and tire assembly; and will lock the wheel and tire assembly in any one of a number of predetermined rotative positions. The holding fixture of the present invention may be provided with two identical mounting brackets, one affixed to a wall or other appropriate vertical surface in a shop, and one which may be affixed to an appropriate vertical surface in the field, such as a side or rear surface of a car trailer, or the like.

The holding fixture of the present invention has a number of advantages over current prior art practice. First of all, a grooving operation can be performed by a single worker. This greatly increases the safety of the operation and leaves the second worker free for other duties. The actual grooving of the tires can be performed much more easily and accurately. The mounting bracket for the holding fixture may be located at a vertical height most comfortable for the worker and the holding fixture may be oriented at any appropriate horizontal angle with respect to the mounting bracket about the coaxial axes of the bolts affixing the holding fixture to the mounting bracket.

New tires remain much cleaner because they are not on the ground or on another tire while being grooved. This, in turn, increases the life of the grooving blades up to about 30%. Older tires with mud in the grooves can be cleaned and regrooved. The dirt can be removed therefrom by simply pounding the tire about its periphery. As will be discussed hereinafter, the holding fixture may be provided with a wheel mounting plate for any wheel and tire combination being used. Finally, the holding fixture is simple in construction and easy to manipulate, greatly improving the tire grooving operation and reducing the time required for a grooving operation.

DISCLOSURE OF THE INVENTION

According to the invention there is provided a holding fixture for a wheel and tire assembly enabling the performance of a number of different operations on the tire, such as grooving. The holding fixture comprises a mounting bracket which can be located on any appropriate vertical surface in the shop, or at the track. The fixture is pivoted to the mounting bracket about a vertical axis and can be tightened on the mounting bracket at any desired rotational position with respect thereto. The fixture comprises a second bracket which is rotatively affixed to the mounting bracket and which mounts a horizontal support tube. Captively and rotatively mounted on the support tube there is a tube segment having a first end to which a wheel mounting plate is affixed and a second end to which a slotted positioning ring is affixed. A locking assembly is fixedly mounted on the support tube and comprises a bracket extending transversely of the support tube and located adjacent the slotted ring. The transverse bracket has a single slot therein with which the various slots of the slotted ring can be aligned. The locking assembly also includes an elongated bar affixed to and extending longitudinally of the support tube and having a locking lever pivotally mounted thereon. The locking lever is pivotable between a retracted position and a locking position in which it enters the slot of the transverse bracket and a selected one of the slots of the slotted positioning ring to lock the wheel and tire assembly in a desired one of a number of predetermined rotative positions. The grooving operation is performed on a portion of the tire, and then the tire is advanced to and locked in another rotative position so that the grooving operation can be continued. This procedure is repeated until the grooving operation is finished.

DETAILED DESCRIPTION OF THE INVENTION

Figure 1:
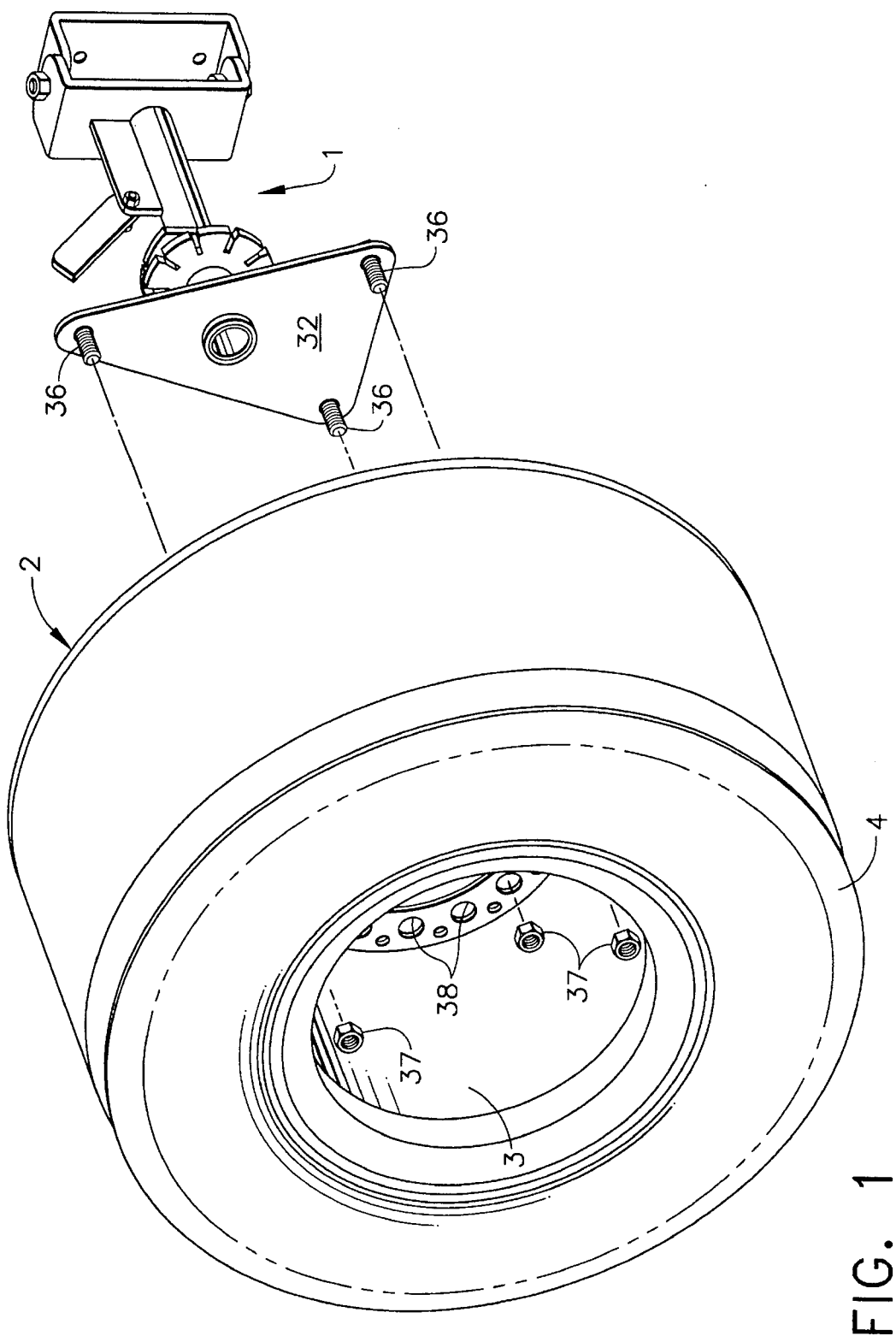
FIG. 1 is an exploded perspective view illustrating a wheel and tire assembly and the holding fixture of the present invention.

In all of the Figures, like parts have been given like index numerals. Reference is first made to FIG. 1 wherein the holding fixture of the present invention is generally indicated at 1 and a wheel and tire assembly is generally indicated at 2. The wheel and tire assembly is made up of a wheel 3 with a tire 4 mounted thereon.

Figure 2:
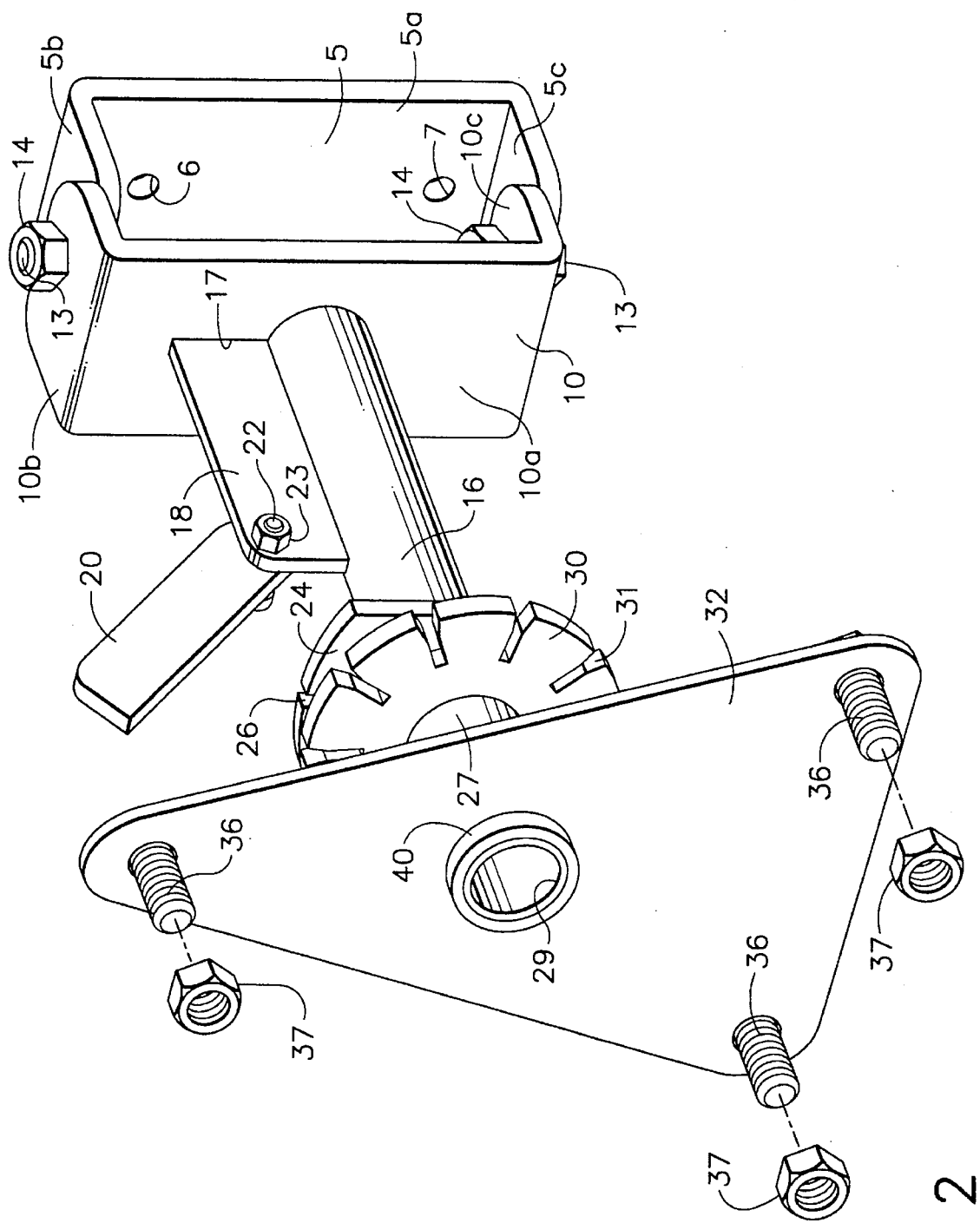
FIG. 2 is a perspective view of the assembled holding fixture of the present invention.
Figure 3:
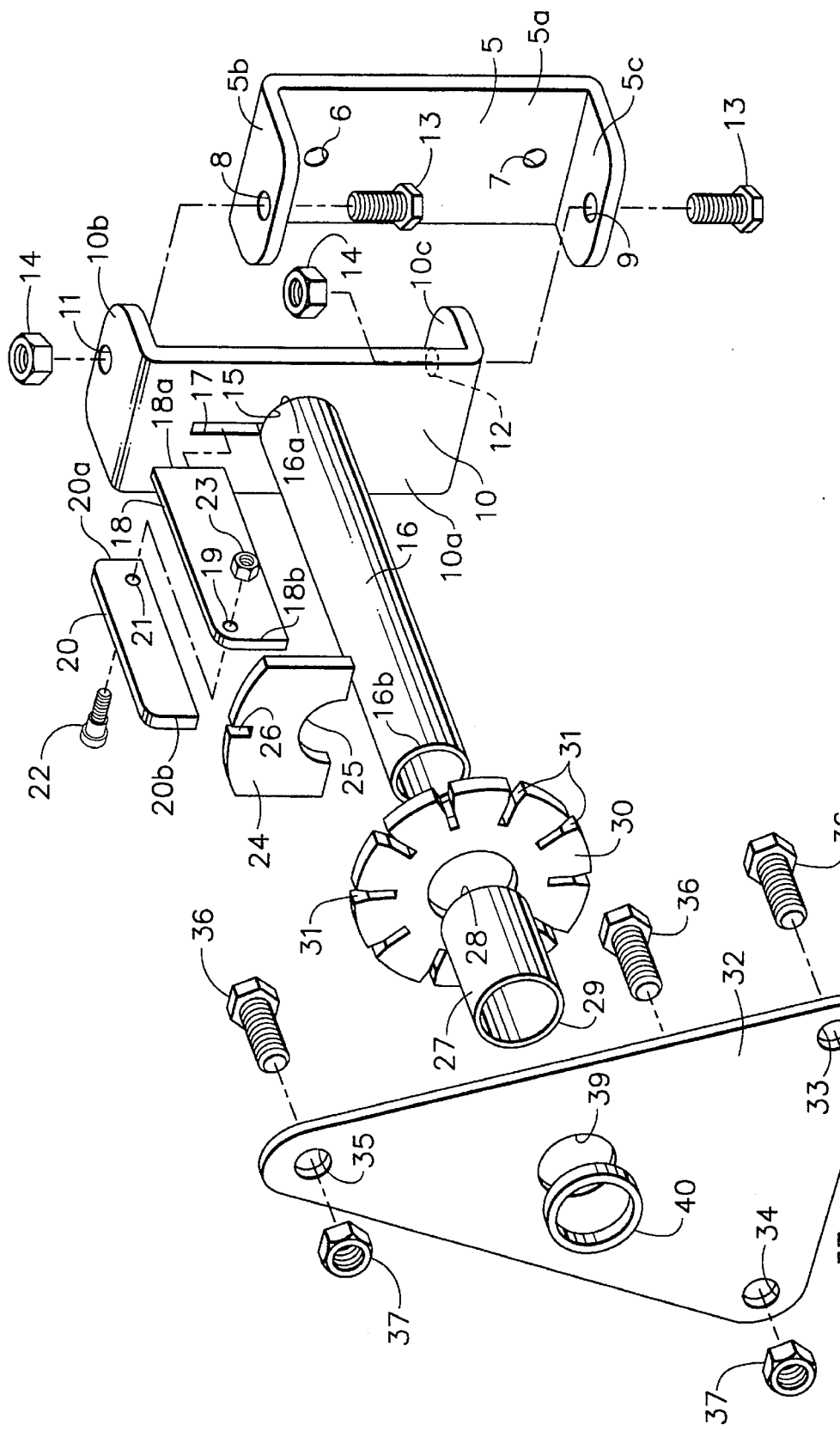
FIG. 3 is an exploded perspective view illustrating the individual parts of the holding fixture of the present invention.

Reference is now made to FIGS. 2 and 3 wherein the holding fixture 1 is most clearly shown. The holding fixture is provided with a mounting bracket 5 of U-shaped configuration. The mounting bracket 5 has a vertically oriented base 5a and a pair of horizontal legs 5b and 5c extending substantially perpendicularly from the base 5a. The base 5a may be provided with perforations 6 and 7 so that it can be bolted or otherwise appropriately affixed to a vertical wall or other vertical surface in a shop or the like, or to an appropriate vertical surface in the field, as at a race track. In fact, it is preferred to provide the holding fixture 1 with two identical bases 5, one mounted in the shop or workplace, and the other mounted to an appropriate vertical surface such as the side or end of an automobile trailer or the like for use in the field. The mounting bracket legs 5b and 5c are provided with coaxial perforations 8 and 9.

The holding fixture is also provided with a fixture bracket 10 substantially identical to mounting bracket 5 and having a U-shaped configuration with a vertical base 10a and horizontal legs 10b and 10c. The legs 10b and 10c are provided with coaxial perforations 11 and 12, similar to the coaxial perforations 8 and 9 of mounting bracket 5.

The fixture bracket 10 and the mounting bracket 5 are joined together by means of bolts 13 and nuts 14. To this end, the legs 10b and 10c of fixture bracket 10 are located above and abutting the legs 5b and 5c of mounting bracket 5 with the perforations 8, 9, 11 and 12 coaxially aligned. One of the bolts 13 is caused to pass through leg perforations 9 and 12 with one of the nuts 14 threadedly engaged thereon. The other bolt 13 is located within perforations 8 and 11 and is threadedly engaged by the other nut 14. Since the holes 8, 9, 11 and 12 and the bolts 13 are coaxial, the fixture bracket is capable of rotation about their common axis. The nuts 14 may be tightened to lock fixture bracket 10 to mounting bracket 5 in any desired rotative position with respect thereto about the common axis of bolts 13.

The base 10a of fixture bracket 10 is provided with a circular perforation 15 sized to receive the rearward end 16a of an elongated support tube 16. The support tube end 16a is welded or otherwise fixed in the perforation 15. The support tube 16 has a free forward end 16b.

The base 10a of fixture bracket 10 has a vertical slot 17 formed therein, extending upwardly from perforation 15. The slot 17 is so sized as to receive the rearward end 18a of an elongated bar 18. The bar 18 has a free forward end 18b. As is clearly shown in FIG. 3, the bar 18 has its rearward end 18a located in the slot 17 of fixture bracket 10 and its bottom edge abutting and extending longitudinally of support tube 16. The bar 18 is welded or otherwise appropriately affixed to fixture bracket base 10a and support tube 16.

In its upper forward corner adjacent the free forward end 18b the bar 18 is provided with a perforation 19. An elongated locking bar 20 is provided, having a rearward end 20a and a forward end 20b. Near the lower portion of its rearward end 20a, the locking bar 20 has a perforation 21 formed therein. The locking bar 20 is rotatively affixed to elongated bar 18 by a shoulder bolt 22 passing through the locking bar perforation 21 and the elongated bar perforation 19. The shoulder bolt 22 is threadedly engaged by a nut 23. Locking bar 20 is pivotable about shoulder bolt 22 between a locking position and an unlocking position, as will be clear hereinafter.

A transverse bracket 24 is provided, having an arcuate notch 25 formed in its lower edge. The arcuate notch 25 is of the same diameter as the outside diameter of support tube 16. The transverse bracket is also provided with a notch 26 in its upper edge. The purpose of notch 26 will be apparent hereinafter. Bracket 24 is located transversely of support tube 16, with support tube 16 received within notch 25. Transverse notched bracket 24 is welded or otherwise appropriately affixed to support tube 16 and is located at a position inwardly of the free end 16b of support tube 16.

A tube segment 27 has a rearward end 28 and a forward end 29. Tube segment 27 has an inner diameter of such dimension as to be slidably mountable on and rotatable on support shaft 16.

A slotted positioning ring 30 has a plurality of identical notches 31 evenly spaced about its peripheral edge. The slotted positioning ring has a central perforation 32 adapted to receive the rearward end 28 of tube segment 27. The slotted positioning ring 30 is welded or otherwise appropriately affixed to tube segment rearward end 28. The purpose of slotted ring 30 will be apparent hereinafter.

A wheel mounting plate is shown at 32. The embodiment shown has a triangular periphery with holes 33, 34 and 35 in each of its corners. The holes 33, 34 and 35 are adapted to accommodate wheel mounting bolts 36 which are provided with nuts 37. As is clearly shown in FIG. 1, the bolts 36 are caused to pass through perforations 33, 34 and 35 in the wheel mounting plate 32 and selected ones of the wheel mounting holes 38. In this way, the assembly 2 of wheel 3 and tire 4 is firmly mounted on the wheel mounting plate 32. The size and configuration of wheel mounting plate 32 may be appropriately varied so that the holding fixture 1 can accommodate various types and sizes of wheels such as 5×5, 5×4½, and 5×4¾ wheels, wheels for sprint cars, and the like.

The wheel mounting plate 32 has a central perforation 39 so sized as to receive the forward end 29 of tube segment 27. Wheel mounting plate 32 is welded in place on the end 29 of tube segment 27.

From the above, it will be apparent that tube segment 27, together with slotted positioning ring 30 and wheel mounting plate 32 constitutes an integral structure capable of being rotatively mounted on the free end 16b of support tube 16. Once in position thereon, the slotted positioning ring will lie adjacent the transverse notched bracket 24. The endmost portion of the free end 16b of support tube 16 will extend through tube segment 27 and slightly beyond the forward face of wheel mounting plate 32. To render the rotatable combination of tube segment 27, slotted positioning ring 30 and wheel mounting plate 32 captive on support tube 16, a ring 40 is welded to the end 16b of support tube 16. The ring 40 could also be a split metal snap ring engaged in a groove in the end 16b of support tube 16.

The combination of tube segment 27, slotted positioning ring 30 and wheel mounting plate 32 may be rotated as a unit so that any one of the slots 31 of positioning ring 30 can be aligned with the slot 26 of transverse slotted bracket 24. The elongated bar 18 is so positioned on support tube 16 that the locking lever, when in its locking position, can have its free end located in the slot 26 of transverse slotted bracket 24 and any one of the slots 31 of slotted positioning ring 30 which is aligned with the transverse bracket slot 26. Thus it will be apparent that the wheel mounting plate together with a wheel and tire assembly 2 mounted thereon can be locked in any one of a number of predetermined rotational positions with respect to the holding fixture.

The holding fixture 1 having been described in detail, the manner in which it is used can now be set forth. The fixture bracket 10 can be affixed to mounting bracket 5 and locked in any desired rotative position with respect thereto by means of bolts 13 and nuts 14. A wheel and tire assembly 2, having the tire 4 to be treated, is firmly affixed to wheel mounting plate 32 by bolts 36 and nuts 37. In this manner, the wheel and tire assembly 2 is rotatively mounted on holding fixture 1. As indicated above, the holding fixture mounting bracket 5 is located at an appropriate vertical height on its mounting surface (not shown) so that the wheel and tire assembly 2 is maintained at a position in which the worker can work thereon in comfort.

The locking lever 20 is lifted to its non-locking retracted position (see FIG. 3) and the wheel and tire assembly 2 can be rotated to the desired position to start a grooving operation. At that position, the locking lever is rotated to its locking position engaged in the groove 26 of transverse bracket 24 and the appropriate one of the slots in the positioning ring 30 which is aligned with slot 26. The grooving operation can then begin. During the grooving operation, the wheel and tire assembly can be unlocked, rotated and relocked until the entire periphery of the tire has been treated. The wheel and tire assembly is then removed from holding fixture 1.

Modifications may be made in the invention without departing from the spirit of it.

What is claimed is:

1. A holding fixture for a wheel and tire assembly, said holding fixture comprising a bracket assembly comprising first and second parts pivoted together about a vertical axis, said first bracket assembly part being mountable on a vertical surface, said second bracket assembly part being pivotable through an arc about said vertical axis and fixable with respect to said first bracket part anywhere along said arc, a horizontally oriented support tube having a first end attached directly to said second bracket assembly part and a free end, a mounting plate assembly for said wheel and tire assembly, said mounting plate assembly including a rotatable tube segment for holding said wheel and tire assembly at one end thereof, and having a positioning means at another end of said tube segment, said tube segment being directly mounted on and about said free end of said support tube and being rotatable thereabout, and a locking assembly associated with said positioning means to releasably lock said mounting plate assembly at any one of a number of predetermined rotative positions about said support tube.

2. The holding fixture claimed in claim 1 wherein said first bracket assembly part comprises a first U-shaped bracket having a vertically oriented base mountable on a vertical surface and a pair of horizontal legs extending perpendicularly from said base, said second bracket assembly part comprising a second bracket substantially identical to said first bracket and having a vertically oriented base and a pair of legs extending perpendicularly from said second bracket base, each of said legs of said second bracket overlying the corresponding leg of said first bracket to form two overlapped leg pairs, the legs of each overlapped pair having coaxial holes formed therein, said first and second brackets being pivotally joined together by a pair of coaxial bolts, each bolt passing through said coaxial perforations in one of said pairs of overlapped legs of said first and second brackets, said horizontally oriented support tube being affixed to said base of said second bracket.

3. The holding fixture claimed in claim 1 wherein said mounting plate assembly comprises a tube segment having first and second ends and being rotatively mounted on said support tube near said free end thereof, said positioning means comprising an annular positioning ring having a plurality of slots formed in its peripheral edge and evenly spaced therealong, said annular positioning ring being fixed on said first end of said tube segment, said mounting plate having a perforation therethrough and being fixed to said tube segment at said second end thereof, said locking assembly having a member releasably engageable in any one of said slots in said positioning ring.

4. The holding fixture claimed in claim 3 including a bracket extending transversely of and affixed to said support tube adjacent said slotted positioning ring, said transverse bracket having a notch formed therein, any of said slotted positioning ring notches being alignable with said transverse bracket notch, an elongated bar being affixed to said support tube and extending from said base of said second bracket toward said transverse notched bracket, a locking lever being pivotally affixed to said elongated bar and being swingable between a retracted non-locking position and a locking position wherein it is received in said transverse bracket notch and any one of said positioning ring notches aligned therewith to lock said mounting plate and said wheel and tire assembly thereon in a desired rotative position.

5. The holding fixture claimed in claim 4 including a narrow ring mounted on and affixed to said free end of said support tube, said tube segment and positioning ring and mounting plate being captive on said support tube between said transverse notched bracket and said narrow ring.

6. The holding fixture claimed in claim 5 wherein said first bracket assembly part comprises a first U-shaped bracket having a vertically oriented base mountable on a vertical surface and a pair of horizontal legs extending perpendicularly from said base, said second bracket assembly part comprising a second bracket substantially identical to said first bracket assembly part and having a vertically oriented base and a pair of legs extending perpendicularly from said second bracket base, each of said legs of said second bracket overlying the corresponding leg of said first bracket to form two overlapped leg pairs, the legs of each overlapped pair having coaxial holes formed therein, said first and second brackets being pivotally joined together by a pair of coaxial bolts, each bolt passing through said coaxial perforations in one of said pairs of overlapped legs of said first and second brackets, said horizontally oriented support tube being affixed to said base of said second bracket.

7. A holding fixture for a wheel and tire assembly enabling a single person to perform a grooving operation on said tire, said fixture comprising a first U-shaped bracket having a vertically oriented base mountable on a vertical surface and horizontal legs extending perpendicularly from said base, a second similar U-shaped bracket having a vertically oriented base and horizontal legs extending perpendicularly therefrom, said legs of said second bracket being adjustably bolted to the legs of said first bracket, the vertical base of said second bracket mounting a horizontally extending support tube, a rotatable tube segment having first and second ends, a slotted positioning ring being affixed at said first end of said rotatable tube segment and a wheel mounting plate for a wheel and tire assembly being affixed adjacent said second end of said rotatable tube segment, said tube segment and said slotted ring and mounting plate being captively and rotatively mounted on said support tube, a lock assembly being affixed to said support tube, said lock assembly being releasably engageable in any one of said slots of the slotted positioning ring to hold a tire and wheel assembly mounted on said mounting plate in any one of a number of predetermined rotative positions about said support tube.

* * * * *

UNITED STATES PATENT AND TRADEMARK OFFICE
CERTIFICATE OF CORRECTION

PATENT NO. : 5,618,228
DATED      : April 8, 1997
INVENTOR(S) : Richard L. Anderson It is certified that error appears in the above-indentified patent and that said Letters Patent is hereby corrected as shown below:

Title page, insert item [73]   Assignee:   R & R Racing Components LLC, Burlington, Kentucky Signed and Sealed this Twenty-eighth Day of October, 1997

Attest:

BRUCE LEHMAN

*Attesting Officer*          *Commissioner of Patents and Trademarks*